3,299,962
TURBINE ENGINE REGULATING EQUIPMENT
Joseph Szydlowski, Usines Turbomeca, Bordes, France
Filed Apr. 14, 1965, Ser. No. 448,025
Claims priority, application France, Apr. 21, 1964,
971,626, Patent 1,401,328
5 Claims. (Cl. 170—135.74)

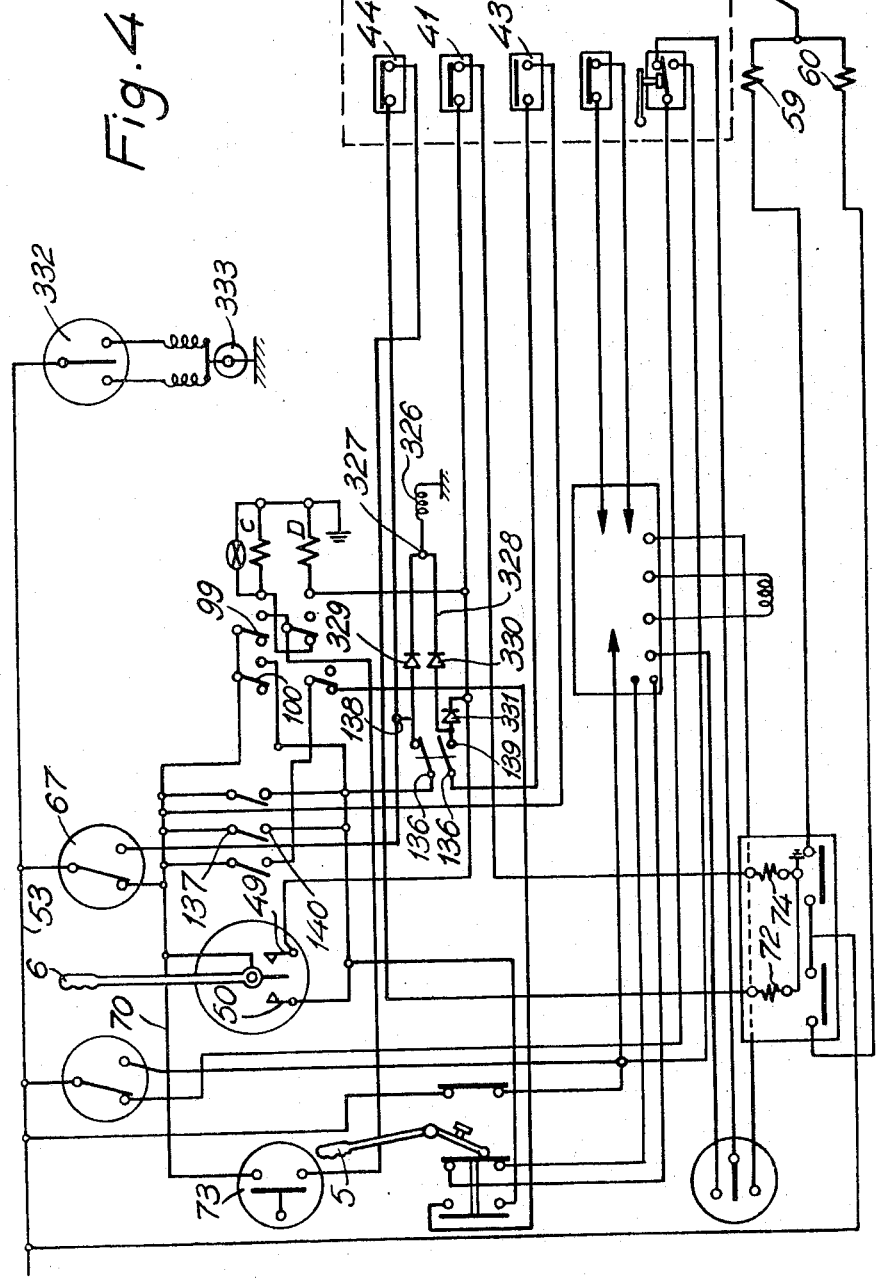

This invention relates to improvements to equipment for regulating turbine engines coupled to an aerodynamic or hydrodynamic propelling device having variable-pitch blades, of the kind wherein pitch changes are controlled as a function of a comparison between the actual fuel flow rate and the maximum flow rate permissible for the turbine, this permissible flow rate being governed by the differential air pressure $(P_2-P_1)$ across the compressor outlet and inlet.

For the sake of greater simplicity in what follows, instead of using the notion of "maximum permissible fuel flow," which is a linear function of $(P_2-P_1)$, it is proposed to adopt the term "thermal load," which will be considered to be equal to 100% when the actual fuel flow is equal to the maximum permissible flow for a given value of $(P_2-P_1)$.

Such a system usually includes a flow or thermal load limiter having a capsule whose two sides are respectively subjected to the compressor inlet and outlet air pressures $P_1$ and $P_2$ and which controls a slide-valve inserted into the fuel line, a flow rate or thermal load comparator connected to this line at points upflow and downflow of the slide-valve controlling closure of pitch-coarsening or fining electrical contacts inserted into a propeller pitch electric control circuit. The thermal load furnished by the comparator can be transferred to any convenient type of indicator device for displaying the indicated thermal load.

Such a system was more particularly described in U.S. Patent No. 3,161,237, filed by the applicant, which system was associated to an isoregulator of the fuel feed, to a unit providing regulation as a function of the temperature, to safety units operating in the event of overspeeding or when the propeller becomes non-tractive, to an automatic setting-under-power circuit and to a phase lead system.

The satisfactory results obtained with this type of regulation led to an endeavour to derive optimum possibilities from this system while at the same time avoiding excessive complication.

It is to be noted that installations of this type include an automatic limitation on pitch coarsening or an automatic pitch fining when the thermal load reached lower and upper thresholds, respectively, of the maximum thermal load permissible for the turbine, at which thresholds the pitch coarsening contact opens and the pitch fining contact closes. Under such conditions, the turbine is invariably operating between two corresponding limit values, it being understood that its rotation speed is maintained constant by the isoregulator. For greater simplicity in what follows, these lower and upper thresholds will be considered as being equal to 95% and 100% respectively of the maximum thermal load allowable for the turbine.

The regulation of the propeller-pitch as a function of the indicated thermal load, however, is linked to the speed regulator, which must maintain the rotation speed constant by operating through the agency of the isoregulator in order to modify the fuel passageway cross-section.

Due to the "inertia" of the engine, and notwithstanding the quality of the isoregulator, a change in rotation speed is not immediately compensated by the speed regulator, so that when automatic setting-under-power takes place the coarsened pitch tends to reduce the rotation speed which the speed regulator, subsequent to sensing, tends to restore. During the entire setting-under-load process, the rotation speed remains slightly below the regulation value, and the higher the rate of change of pitch, the greater will be this lag in the rotation speed. As a direct consequence of this, the actual fuel flow rate for any value of $(P_2-P_1)$ will be less than what it would be were the rotation speed to have been maintained constant.

As a result, the pitch-coarsening process occurring for the indicated thermal load of 95% is arrested when the pitch is too coarse. When the speed regulator fully restores the rotation speed, the indicated thermal load exceeds 95%, and if it reaches or exceeds 100% the pitch-fining process is triggered, resulting in a degree of oscillation before the steady state is achieved. If this effect is unduly accentuated, it could cause the engine to overheat.

Clearly, this situation cannot be remedied by reducing the 95% thermal load, i.e. the load value at which pitch coarsening is cut-off, since this would reduce engine power.

The present invention has for its object to overcome this drawback and to accordingly provide a method of regulating turbine engines driving a propelling device equipped with blades the pitch of which is variable as a function of that percentage value which the turbine thermal load represents with respect to the maximum permissible turbine thermal load set by the differential air pressure $(P_2-P_1)$ across the compressor outlet and inlet, said method consisting in automatically operating on the maximum turbine thermal load value whereby to cause the turbine to work at reduced power for an indicated thermal load lying between 0 and 95%, at normal power for an indicated thermal load lying between 95 and 100%, and at reduced power once more if an indicated thermal load of 100% is exceeded.

The invention further has for its object regulating apparatus for performing the method hereinabove specified, said regulating apparatus being of the thermal load limiting and comparing type referred to precedingly and comprising a branch with calibrated constriction that is tapped off the $P_2$ supply line to the thermal load limiter and into which is fitted an electrically-operated valve or like device controlled in such manner as to produce a spillage through said branch during closure of the pitch coarsening or fining contact responsively to said comparator.

When the spillage passage is open, the air pressure transmitted to the side of the limiter capsule normally connected to the compressor outlet is lower, thereby reducing the value of the differential pressure operating on this capsule, in the same way as if the actual value of $(P_2-P_1)$ had been reduced.

Now the maximum permissible fuel flow and the maximum thermal load on the turbine depend upon the value of the differential pressure acting on the limiter capsule, so that the maximum permissible flow and the maximum thermal load are lowered. Hence if the pitch coarsening contact opens for an indicated thermal load of approximately 95% and the pitch fining contact closes for an indicated thermal load of approximately 100%, then the device hereinbefore described will produce a spillage when the indicated thermal load lies between 0 and 95%, will arrest this spillage when the indicated thermal load reaches 95% or stays included between 95 and 100%, and will restore it when the indicated thermal load reaches or exceeds 100%.

Such a solution permits of obtaining an adequate actual flow/maximum permissible flow ratio during the automatic setting-under-power, by reducing the differential pressure acting on the capsule.

It is possible to so determine the spillage rate as a function of the rate of change of pitch, that on shutting off the spillage there be no change in indicated thermal load, the gas temperature and the rotation speed achieving the steady state without oscillation.

The dimensions of the calibrated orifice are to that end determined in such manner that the reduction in the differential pressure acting on the capsule cause a reduction in the actual fuel flow of about 8%, for example.

The important advantage afforded by this improvement, particularly for aircraft take-offs and landings, is that it permits a 30 to 50% increase in the speed with which the setting-under-power is effected, without danger of engine overheating or loss in power.

Both the protection of the turbine and the regulation function are likewise greatly improved when the 95% thermal load has been reached after shutting off the spillage and halting the pitch changing process.

Due to variations in flight conditions, the engine may be placed under higher loading conditions through the action of the speed governor.

With a view to protecting the engine against an unduly high increase of this sort, provision had been made in the system described in U.S. Patent No. 3,161,237 for an automatic pitch fining when the load reached a value equal to or greater than 100%.

Automatic re-opening of the spillage under identical conditions provides an immediate reduction in the fuel flow before the pitch has begun the fining process.

Furthermore, the fact of maintaining the spillage operative throughout the pitch fining offers the same "phase lead" advantage as during the setting-under-power.

Since the spillage is shut off automatically as soon as the load has dropped below 100%, the engine can then resume operation under the normal thermal load, thereby ensuring perfect regulation between the fixed limits of 95 and 100%.

In the conventional regulating system, the automatic regulation function is operative only for maximum power and temperature conditions in the engine. Of course, the pilot can select manually engine operating conditions giving reduced power, but with such a system this reduced power is not regulated automatically.

It is a further object of the present invention to be able to cause the automatic regulation function provided in the conventional regulating system to operate for all power settings required by the pilot other than maximum power, in the same way that it operates for maximum power and temperature conditions.

In accordance with the invention, an additional spillage is accordingly provided on the conduit connecting the capsule to the compressor outlet, and this spillage is adjustable by a progressively acting valve or like device controlled by the pilot.

Thus the pilot can dispose of a cruising power lower than amximum power, notwithstanding an indicated thermal load included between 95 and 100%. With the indicated load maintained between 95 and 100%, the cruise power will be regulated like the maximum power.

It is also to be noted that no difficulty stems from combining the two spillage systems, to wit the pilot-conrolled spillage and the automatic spillage. These various modifications can be carried out very simply without in any way changing the conventional regulating apparatus.

It is to be noted, however, that by reason of the advantages afforded by these improvements, it is possible to dispense with the phase lead system as well as with the temperature limitation function, which then becomes excessive.

The description which follows with reference to the accompanying non-limitative exemplary drawings will give a clear understanding of how the invention can be carried into practice.

In the drawings:

FIG. 4 is a circuit diagram for the electrical part of the control and regulating system of FIG. 3, the engine being halted and the propeller feathered under static ground conditions.

Figure 1:
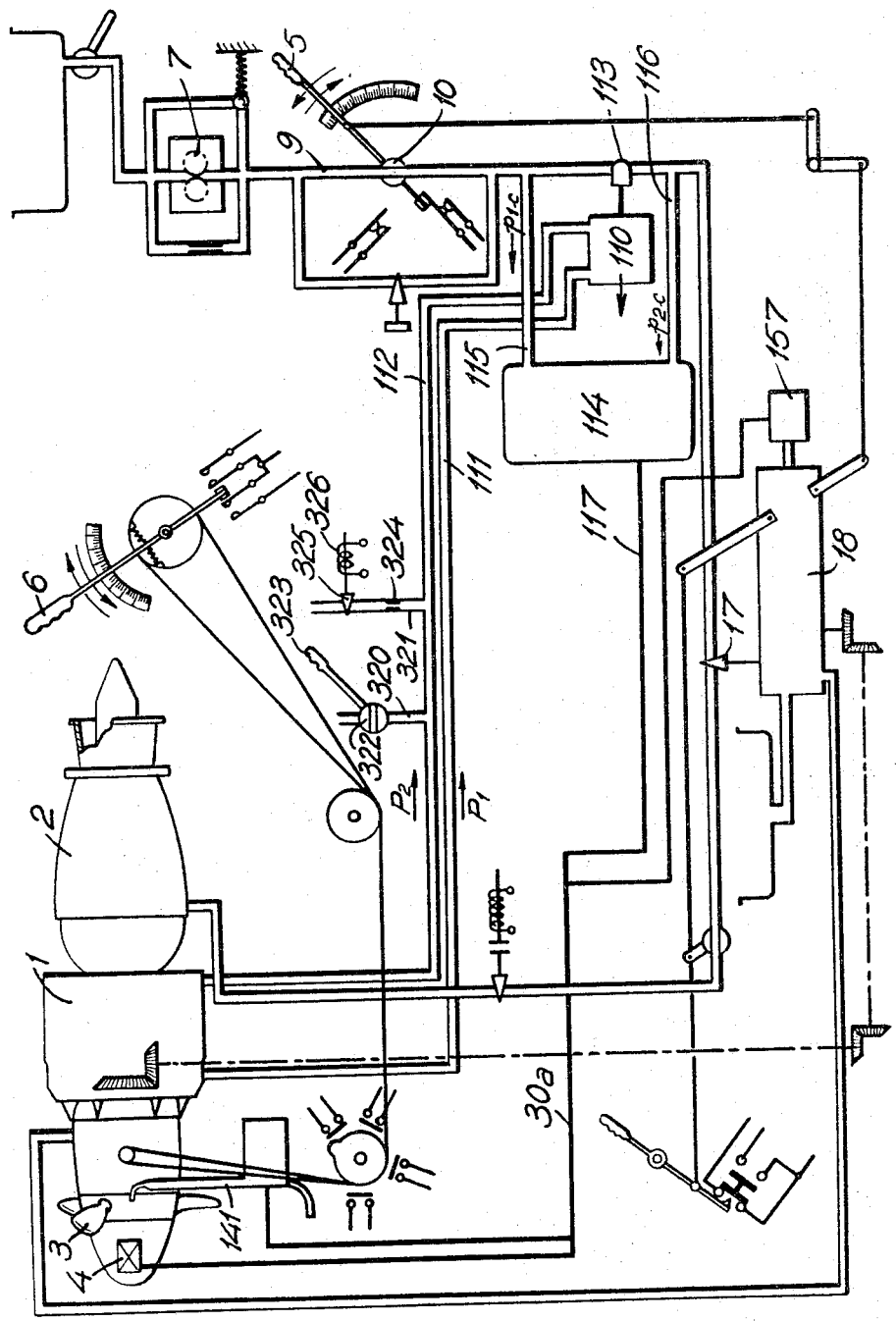
FIG. 1 is a diagrammatic representation of the mechanical part of a turbine engine control and regulating system according to the invention.
Figure 2:
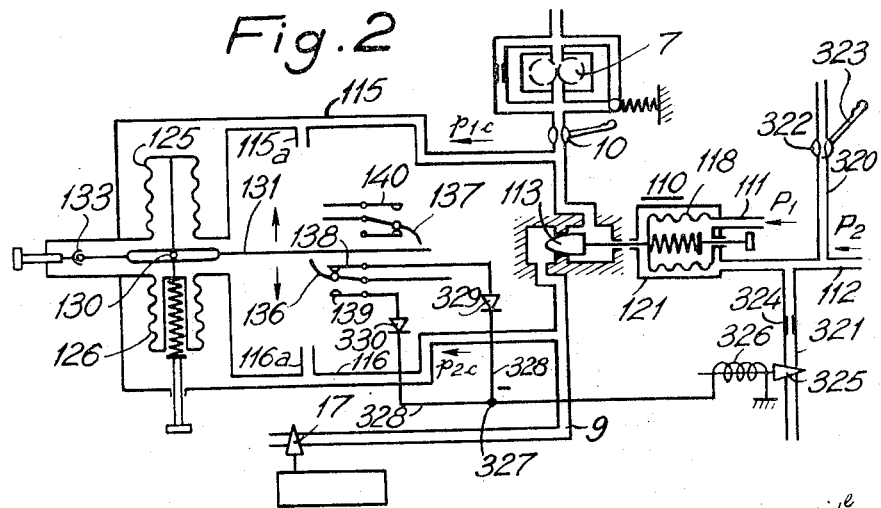
FIG. 2 shows diagrammatically the thermal load determining elements of the system of FIG. 1.

FIGS. 1, 2 and 4 partially reproduce certain of FIGS. 1 through 9 of U.S. Patent No. 3,161,237, and, in order to simplify the ensuing description, like parts bear the same reference numerals as those in the above-cited patent.

However, as indicated precedingly, the regulating system according to the present invention no longer includes a limitation of the propeller pitch or of the thermal load on the engine as a function of the gas temperature past the turbine.

As is diagrammatically shown in FIG. 1, the turbine engine comprises a compressor 1, a turbine 2 and a variable-pitch propeller 3 controlled by an electric motor 4 embodying fine-pitch and coarse-pitch circuits. This turbine engine is controlled by means of a throttle lever 5 and a pitch lever 6.

The components associated to the throttle lever 5 include a fuel pump 7 feeding a line 9 into which is inserted a valve 10 controlled by the lever 5. Into the line 9 is inserted a metering device 17 controlled by a tachometer unit 18 or an isoregulator of the type described in U.S. Patent No. 3,002,502, filed by the applicant, downflow of which said line extends to the fuel injectors of turbine 2.

Blade pitch control for the variable pitch propeller 3 is provided by the motor 4 which receives its commands, according to operating conditions, from the thermal load comparator 114, the device 141 for sensing whether the propeller 3 is tractive or not, from the overspeed safety device 157, or from the pitch lever 6.

The manner in which the devices 141 and 157 are devised and operate is described in the above-cited U.S. patent and will not be described anew, nor will the several devices utilized for enabling the pitch lever 6 to display the propeller pitch.

As FIGS. 1 and 2 clearly show, a device 110 receives, through the lines 111 and 112, the air pressures $P_1$ and $P_2$ on entry and exit from the compressor 1 and controls the movements of a slide-valve 113 connected into the line 9 between the valves 10 and the metering device 17. The fuel pressures $p_{1c}$ and $p_{2c}$ upflow and downflow of the slide-valve 113 are respectively led into a comparator 114 through conduits 115 and 116. The comparator is electrically connected through a wiring harness 117 to the pitch changing motor 4.

The device 110 comprises a capsule 118 against the bottom of which bears an adjustable spring and into which the air pressure $P_1$ is admitted through the conduit 111. The capsule 118 is enclosed in a chamber 121 into which the air pressure $P_2$ is led through a conduit 112. A rod fixed to the bottom of capsule 118 carries on its free end the slide-valve 113 inserted into the line 9. Deformations of capsule 118 responsively to the pressure differential $(P_2-P_1)$ which it sustains cause linear shifts of slide-valve 113 proportional to the value of $(P_2-P_1)$ and hence to the value of the corresponding 100% thermal load. Two by-pass pipes 115 and 116 tapped off the line 9 respectively convey the fuel pressures $p_{1c}$ upstream of slide-valve 113 and $p_{2c}$ downstream thereof and upstream of metering device 17, to the thermal load comparator 114. This comparator consists of two capsules 125 and 126, of which the former receives the pressure $p_{1c}$ and the latter the pressure $p_{2c}$. Capsule 126 includes an adjustable spring. The bottoms of capsules 125 and 126 are interconnected by a rod onto which is fixed a crank 130. A balance-beam 131, of which one end is fitted with a block pivotally connected to a clevis 133 of adjustable position, carries a slideway accommodating the crank 130.

Two travelling contacts 136 and 137 are placed on opposite sides of the balance beam 131. Two fixed contacts 138 and 139 flank the contact 136, and a fixed contact 140 is mounted adjacent the contact 137. The distances of the contacts 136 and 137 from the block 132 are in the same ratio as the $Q_{max}$ and $Q_{min}$ values.

Contact between 136 and 138 remains established as long as the indicated thermal load on the turbine is below 95%, and in this case the propeller pitch can be coarsened either automatically or manually, or be fined manually only. The contact 136–138 opens when the indicated thermal load on the turbine reaches the 95% value.

The contact 136–139 closes when the indicated thermal load on the turbine is equal to 100% and opens for a lower indicated thermal load that remains above 95%. When this contact is closed the propeller pitch is automatically fined.

When the pilot presses the automatic setting-under-power button 73 the relay C is energized by the following circuit: current source, line 53, contactor 67, line 70, closed button 73, energized relay C and earth. Energization of the relay C moves the contacts 99 and 100 onto their working contact studs, with contact 99 providing self-energization of the relay. The pitch then coarsens automatically through the following circuit: current source, line 53, contactor 67, line 70, contact 100 on its working stud, closed contact 136–138, feathering microswitch 44, relay 72 and earth, with relay 72 closing the feed circuit to the coarse pitch winding 60 of motor 4.

When contact 136–138 opens for an indicated thermal load equal to 95%, the pitch angle attained retains its value. If the indicated thermal load continues to increase, then when it reaches 100% the contact 136–139 closes and automatically fines the pitch through the following circuit: current source, line 53, contactor 67, line 70, pitch microswitch G43, closed contact 136–139, thereby energizing relay D and de-energizing relay C and opening contacts 99 and 100, reverse microswitch 41, relay 74 and earth. Relay 74 closes the feed circuit to the fine-pitch winding 59 of motor 4.

In the event of a manual pitch coarsening control action, the contact 50 of pitch lever 6 is energized via line 70, followed by relay 72 via closed contact 136–138 and feathering microswitch 144. In the event of a manual pitch fining, then the pitch lever contact 49 is energized via line 70, followed by the relay 74 via reverse microswitch 41.

As may be seen from FIG. 1, two vented branches 320 and 321 are tapped off line 112. Connected into line 320 is a progressive-acting valve 322 controlled by a lever 323 at the pilot's disposal. The branch 321 comprises a calibrated orifice 324 downflow of which is movable the slide-valve 325 of an electrically-operated valve controlled by a winding 326.

As FIGS. 2 and 4 show, this winding 326 is shunted, at a point 327, off a circuit 328 connecting contacts 138 and 139. Two diodes 329 and 330 are inserted into this circuit between contacts 138 and 139 and the point 327 in order to prevent any current from reaching these contacts from the point 327. In addition, a diode 331 is connected in immediately after the contact 139 to prevent current from returning to the latter through reverse microswitch 41.

The system hereinbefore described functions in the following manner:

When either of contacts 136–138 or 136–139 is closed, the winding 326 is energized and opens the electrically-operated valve, thus producing a spillage from the line 112 via the branch 321. This causes the air pressure $p_2$ conveyed through the conduit 112 to the capsule 118 to be lower than the air pressure $P_2$ on exit from the compressor. As a result, the differential pressure $(p_2-P_1)$ acting on the capsule is less than the actual differential air pressure $(P_2-P_1)$ across the compressor. The resultant position of slide-valve 113 is then such that the fuel flow through the line 9 is less than what it would have been had the differential pressure $(P_2-P_1)$ acted on the capsule.

Concurrently, the maximum thermal load on the turbine for the differential pressure $(p_2-P_1)$ is less than the maximum permissible thermal load on the turbine for the differential pressure $(P_2-P_1)$.

Therefore, as long as the indicated thermal load remains below the setting-value of contact 136–138, i.e. 95%, the electrically-operated valve winding 326 will be energized and the slide-valve 325 opened whereby to provide spillage for operation below $(p_2-P_1)$.

Figure 5:
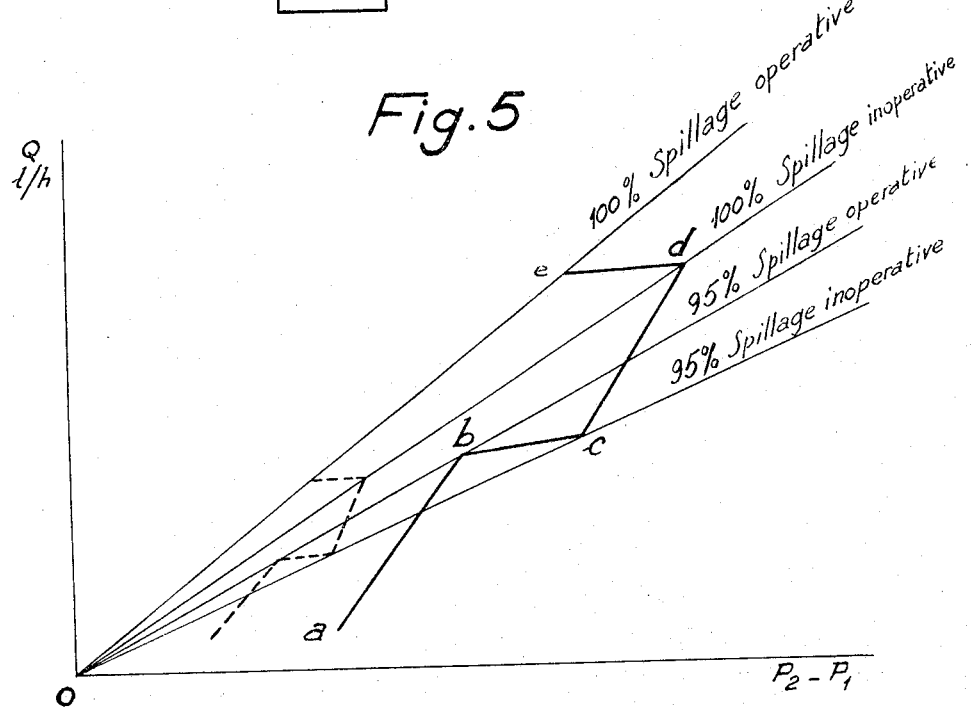
FIG. 5 shows a curve plotting the fuel flow rate Q in litres per hour against the differential pressure $(P_2-P_1)$.

The portion $ab$ of the graph on FIG. 5 reflects the variation in the fuel flow during the setting-under-power up to the point where the bottom threshold of the maximum thermal load is reached, causing the spillage to be shut off with consequent shifting of the operating point from $b$ to $c$ and halting of the pitch coarsening process.

When the flight conditions change (diminished thermal load), the spillage becomes operative anew and the operating point is restored to the point $b$ or onto the portion $ab$.

Conversely, if changes in the flight conditions cause the thermal load to increase and the operating point to be shifted along the portion $cd$ with the spillage inoperative, then if the upper threshold of the maximum thermal load is exceeded the spillage will operate anew and theoretically restore the operating point from $d$ to $e$, in conjunction with a pitch fining command, thereby restoring the operating point to a value below that corresponding to the point $d$, and shutting off the spillage.

This system permits automatic operation during take-off regimes. It also provides regulation for powers below maximum power. To obtain this the pilot commands adjustment of the supplementary spillage through the conduit 320 by operating on lever 323 in order to open the progressive-acting valve 322.

Regulation of the selected power is effected as follows: The engine having been set at maximum power—automatically for example—with the valve 322 closed and the thermal load indicator showing 95%, the automatic regulating function will then be under the conditions required for it to be operative. If the pilot desires to set the load at 75%, he shifts to manual control and fines the propeller pitch until the indicator needle reaches the 75% graduation mark, with the valve 322 still closed. The pilot then gradually opens the valve 322 until the indicator again shows 95%, with the gas temperature on exit from the turbine remaining unchanged. The pilot then shifts to the automatic mode once more, thus providing him with automatic regulation throughout the flight for a power setting of 75%.

If a higher power setting is required, the above procedure must be repeated. Should the pilot desire to revert to maximum power conditions immediately, all he need do is to fully close the spillage control valve 322 immediately.

Figure 3:
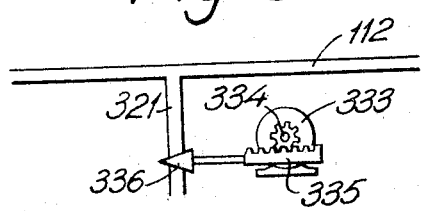
FIG. 3 shows a modification to the mechanical system of FIG. 1.

In the form of embodiment shown in FIGS. 3 and 4, instead of operating directly on the progressive-acting valve, the pilot operates on a trimmer 332 controlling a two-way-rotating electric motor 333 driving a pinion 334 meshing with a toothed rack 335 rigidly connected to a slide-valve 336 which opens and closes the supplementary spillage.

Manifestly, many changes and substitutions of parts may be made to the specific forms of embodiment hereinbefore described with reference to the accompanying drawings, without departing from the scope of the invention. By way of example, the electrically-operated valve could be devised or actuated by an auxiliary relay in such manner that the spillage be opened when the winding of said valve is de-energized, and shut off when it is energized. Similarly, the electrically-operated valve and the progressive-acting valve could be replaced by other similar devices.

Whilst the invention has been described as applied to a propeller, the blade pitch angle of which is controlled by an electric motor, it could obviously be applied to a hydraulically or otherwise controlled propeller.

What I claim is:

1. A method for regulating turbine engines driving a compressor and a propelling device having blades the pitch angle of which is variable as a function of the percentage value represented by the engine thermal load with respect to the maximum permissible thermal load thereon as determined by the air pressure differential ($P_2-P_1$) across the outlet and inlet of said compressor, consisting in successively determining the actual thermal load, automatically operating on the value of the maximum thermal load on the turbine whereby, on one part, to cause said turbine to operate at reduced power when said actual thermal load ranges from zero to the bottom threshold of its maximum permissible value, on a second part, to cause said trubine to operate at normal power when said actual thermal load lies in the range between the bottom and upper thresholds of said maximum permissible value, said bottom threshold being included in said range, and on a third part, to cause said turbine to operate at reduced power when said actual thermal load is at least equal to said upper threshold of said maximum permissible value.

2. In an apparatus for regulating turbine engines fed through a fuel feedline, driving a compressor and a propelling device with blades and having a device for varying the pitch angle of said blades as a function of the percentage value represented by the engine thermal load with respect to the maximum permissible thermal load thereon as determined by the air pressure differential ($P_2-P_1$) across the outlet and inlet of said compressor, of the type which comprises in combination a thermal load limiter, a slide-valve inserted into said fuel feedline, means for linking said thermal load limiter to said slide-valve, means for making said thermal load limiter responsive to said air pressure differential across the compressor outlet and inlet having a first pipe interconnecting said thermal load limiter and said compressor outlet and a second pipe interconnecting said limiter and said compressor inlet, a thermal load comparator, means for operatively connecting said comparator to said fuel feedline upflow and downflow of said slide-valve, electrical contacts operatively connected to said device for varying said pitch angle of said blades of the propeller, and means for operatively connecting said thermal load comparator to said contacts, the improvements which consist in a branch opened in the atmosphere and tapped off said first pipe, a calibrated constriction on said branch, an electrically-operated valve on said branch, and means for controlling the position of said valve as a function of the position of said contacts.

3. An apparatus as claimed in claim 2, which comprises a second branch opened in the atmosphere and tapped off said first pipe, a progressive-acting valve on said second branch and manually-operated means for controlling the position of said progressive-acting valve.

4. An apparatus as claimed in claim 3 in which said electrically-operated valve is a slide-valve.

5. An apparatus as claimed in claim 4, which comprises a toothed rack, means for operatively connecting said toothed rack to said slide-valve, a pinion engaging said toothed rack, a two-way-rotating electric motor, means for connecting said motor to said pinion and a manually-operable trimmer for energizing said two-way-rotating motor.

References Cited by the Examiner
UNITED STATES PATENTS
3,161,237  12/1964  Szydlowski _____ 170—135.74

JULIUS E. WEST, *Primary Examiner.*